United States Patent [19]

Lovendahl

[11] 3,899,813

[45] Aug. 19, 1975

[54] SLOTTING CUTTER APPARATUS

[76] Inventor: Norman H. Lovendahl, 814 N. Clinton, River Forest, Ill. 60305

[22] Filed: Dec. 13, 1973

[21] Appl. No.: 424,376

[52] U.S. Cl. .............................. 29/105 R; 83/839
[51] Int. Cl.² ........................................... B26D 1/12
[58] Field of Search .......................... 29/105 R; 83/839–844

[56] References Cited
UNITED STATES PATENTS

| | | | |
|---|---|---|---|
| 3,378,901 | 4/1968 | Dupuis | 29/105 |
| 3,587,150 | 6/1971 | Menard | 29/105 |

Primary Examiner—Leonidas Vlachos
Attorney, Agent, or Firm—Alter and Weiss

[57] ABSTRACT

A slotting cutter apparatus, the body of which apparatus has peripheral slots which extend through the body and receive insert blades retained within the cutter body by retaining wedges. The insert blades are positioned by novel "top-hat" shaped button-like locators to extend fixed distances from said body.

17 Claims, 10 Drawing Figures

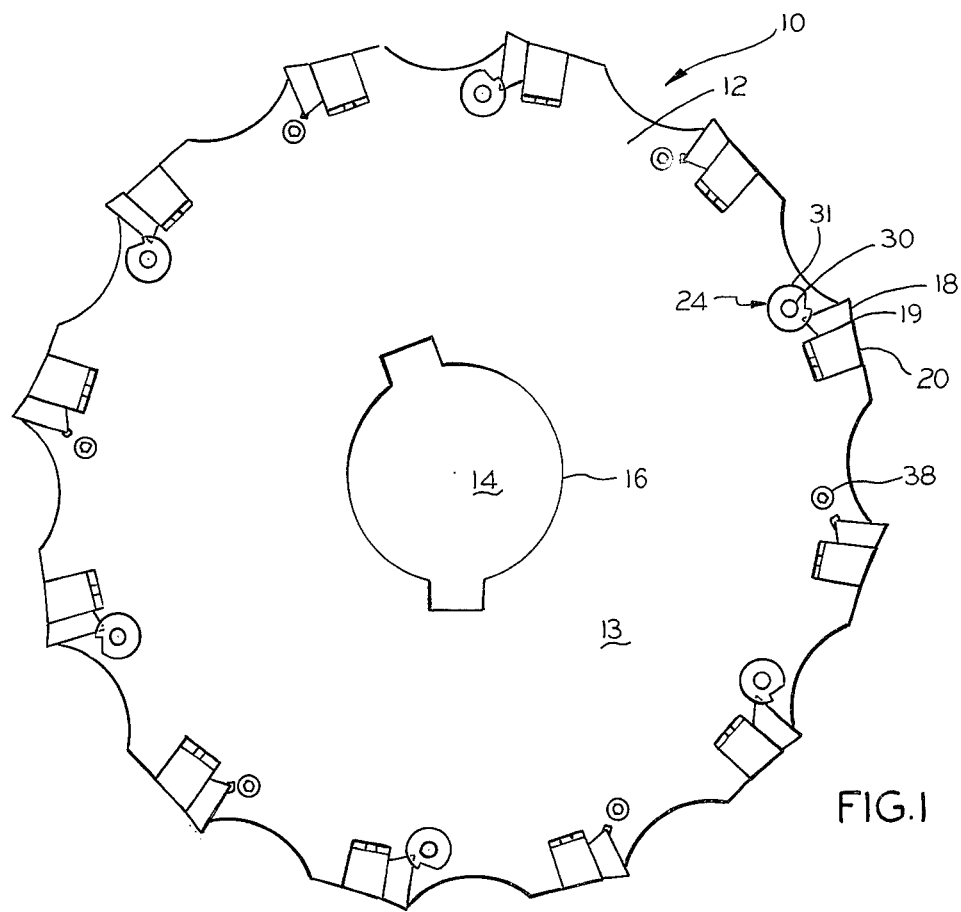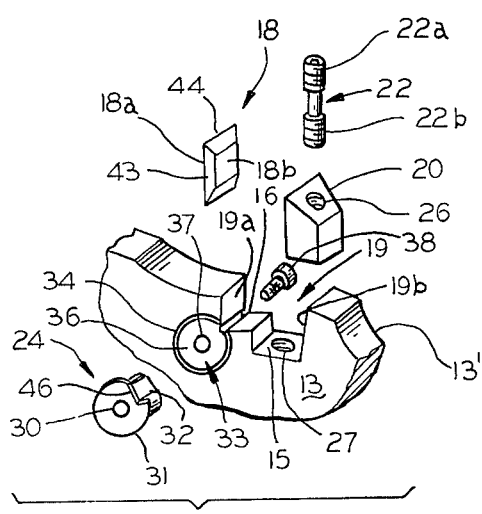

3,899,813

SLOTTING CUTTER APPARATUS

This invention relates generally to slotting cutters, and more particularly, to novel elements for adjusting and positioning cutting inserts used in such cutting tools.

A slotting cutter is a milling cutter that is used to cut rectangular slots in workpieces. One type of milling cutter that performs the slotting function has slots cut through the periphery of a flat cylindrical body. Insert blades are held in the slots with wedges which also act to support the blades.

In the past the cutting inserts were precisely positioned for cutting slots of desired dimensions using magnetic micrometers, indicating fixtures or step gauges. Some prior art slotting cutters were provided with adjustment cams built into the slots. These prior art adjustment means have some apparent inherent disadvantages. For example, it is relatively expensive to provide the special tools, i.e. magnetic micrometers indicating fixtures and step gauges, necessary for setting the inserts. These adjustment tools are relatively sophisticated and require technical skill to operate. Also, those cutters built with adjustable cams have a limited range due to the small adjustments possible. The built-in cams are further impaired because of the space required for the adjusting cam in the blade slots. Further, every time a blade is removed for sharpening, the sophisticated tools must be used to reset the blade.

An object of the invention is to provide slotting cutters having unique means for inexpensively and accurately setting the insert blades to cut slots of desired widths.

Another object of the invention is to provide means for accurately positioning the insert blades in milling cutters without using micrometers, indicating fixtures or step gauges.

A related object of the invention is to provide adjustable slotting cutters having the means for adjusting the width of the cut attached in the cutters so that the insert blades may be removed for sharpening or replaced right on the job without requiring any resetting.

Yet another object of the invention is to provide adjustable slotting cutters wherein means are provided for setting the width of the slots at the cutting side of the insert blades and wherein the insert blade is reliably supported during the cutting operation.

A related object of the invention is to provide position setting means attached to the body of the slotting cutters for setting the position of the cutters. The attachment may be accomplished by threading the setting means directly into the body of the slotting cutter or by using retaining screw means.

A further object of the invention is to provide slotting cutters having cutting blade inserts locating or setting means of different lengths to obtain different sized slots.

In a preferred embodiment of the invention, the insert blades of indexable insert slotting cutters are positioned using position setting buttons that are generally "top-hat" shaped. The body of the cutter has holes machined therein for receiving the body of the top-hat. The brim of the top-hat extends a desired distance beyond the end faces of the cutter body and acts as the blade stop. A screw from the opposite side of the cutter body holds the top-hat in position. The length of the top-hat body determines the position of the insert blades and, consequently, the width of the cut slot. The insert blade can be removed and then easily reset on the job by having the blade abut the brim of the top-hat position setting button locator.

A notch may be cut into one side of the top-hat for use where locating is accomplished behind the cutting edge of the blade.

These and other features and objects of the invention will be apparent upon studying the following detailed specification in conjunction with the drawings, in which:

FIG. 1 is a side view of the slotting cutter;

FIG. 2 is a pictorial exploded view of the cutter section;

FIG. 3 is a cross-section through a typical blade retaining wedge;

FIG. 4 is a top view of an exemplary top-hat shaped blade position setting button;

FIG. 5 is a cross-sectional view taken through the setting button;

FIG. 6 is a cross-sectional view taken through a portion of a slotting cutter with the setting button positioning a blade illustrating the slot width cut;

FIG. 7 is a cross-sectional view taken through a portion of a slotting cutter with a setting button positioning a cutter blade and illustrating the setting button used with a rectangular blade;

FIG. 8A is a side view of the setting button locating the rectangular blade of FIG. 7;

FIG. 8B is a top sectional view of the setting button locating the rectangular blade of FIG. 7; and FIG. 9 is a cross-section through a portion of a slotting cutter and setting button, illustrating a threaded setting button.

Referring to FIGS. 1 and 2 the milling cutter 10 includes a flat cylindrical body 12 having opposite end faces 13 and 13'. An axial bore 14 is provided at hub 16 for mounting the slotting cutter on an arbor. A plurality of characterized spaced slots, such as slot 19, are provided on the periphery of said body 12. The slots extend through the body 12 of the cutter. Typically, the slot has a deeper rear position 15 and a shallower blade nesting front position 16. Positioned in each of the slots is an insert blade, such as insert blade 18, and a blade retaining wedge, such as wedge 20.

Each slot has two faces; a front face 19a and a rear face 19b. The blade retaining wedge 20 is inserted adjacent to said rear face 19b, with the blade 18 inserted between the retaining wedge 20 and the front face 19a. Each wedge 20 has a fastener, such as fastener 22, to hold the wedge firmly in the slot 19 within the cutter body 12. Further, no wedge is wider than the slot 19.

Each wedge has a larger front to back dimension at the top thereof than at the bottom thereof. Therefore, when a wedge, such as wedge 20, is forced down by fastener 22, it presses firmly in slot 19 and locks the insert blade into position. This characteristic of wedge 20 is best seen in FIG. 3 showing that the dimension front to back at the top 23 is longer than the front to back dimension at the bottom.

Each of the insert blades, such as insert blade 18, shown in FIG. 2, is axially shifted to protrude from opposite end faces. Thus, the insert blades are usually alternately shifted axially in the slot until the blades protrude from each side the amount desired to machine a slot having the width required. In the past, the amount that the blade protrudes has been set using fixtures, magnetic micrometers or clamp-on indicators.

When the blade is finally adjusted in the slot, to protrude a desired precise distance, it is locked in place by the wedge which forces the front of the blade 18a against the front face 19a of slot 19, above step 16 with the blade resting on step 16. The wedge is forced against the rear face 19b of the slot 19 as the wedge is driven closer to the bottom of the deep part 15 of the slot 19.

As shown in FIG. 2, both the wedge 20 and the bottom deep portion of the slot 19 have threaded holes therein for receiving the fastener 22. Thus, wedge 20 is shown having threaded hole 26 for receiving portion 22a of fastener 22; and portion 15 of the slot has threaded hole 27 therein for receiving the oppositely threaded portion 22b of the fastener 22. It should be noted that other types of fasteners can be used for forcing the wedge into a locking position relative to the insert blade.

Means are provided for adjusting the distance which the blade extends beyond the end face of the slotting cutter body. More particularly, novel top-hat shaped button-like locators are used, such as button locator 24 shown in FIG. 2, and FIGS. 4-9. The bottom locator comprises a rim portion 31 and a shank or body portion 32. A threaded hole 30 extends through a locator 24. The length of the shank portion determines the amount which the insert blade protrudes past either face of the slotting cutter. By varying this length the same cutter can be used for a plurality of different widths. The rim portion 31 abuts against a portion of the insert blade to limit the amount of the protrusion.

Aperture means, such as compound aperture 33, are provided on alternate end faces of the slotting cutter. The compound aperture means 33 comprises two separate countersunk portions and a hole passing completely through the body of the slotting cutter. The hole passing through the body of the slotting cutter is countersunk on the end face opposite the two countersunk portions. The countersunk portions and holes are coaxial and are parallel to the axis of the slotting cutter. The first and largest diameter countersunk portion 34 is of a diameter which enables the rim portion 31 of the locator to fit therein. The second countersunk portion 36 is of sufficient diameter to enable the passage therethrough of the shank portion 32 of the button locator. The hole 37 enables a threaded fastener to pass therethrough, such as retaining screw threaded fastener 38. The retaining screw 38 is shown as an allen head screw and threads into threaded aperture 30 of button locator 24 to pull the locator 24 so that the bottom of shank 32 abuts the bottom of countersunk portion 36.

As shown in FIG. 5, the rim 31 of the button locator 28 has a flat cylindrical shape. The cylindrical shape can accommodate insert blades which are rhomboidal, such as shown in FIGS. 6 and 9. Then the bottom of the blade 18, for example, rests on the step of the shallow portion 16 of the characterized slot 19, while the cutting edge abuts the tool side of the rim 31 with a portion of the cutting edge protruding beyond the top side of rim 31 a distance shown in FIG. 6 as 41. The retaining screw 38 holds the button locator 24 juxtaposed to the bottom of countersunk portion 36 of compound aperture 33. The length of the shank portion 32 of button locator 24 determines the amount that the blade 18 protrudes at 41. It should be noted that the protrusion distance is independent of the insert blade dimensions.

As shown in FIG. 6, the slot width is determined by the dimensions 42 which is the overall protrusion of the insert blades 18, 18' from each end face of the cutting tool. Here, again, the button locator 24, held in place by retaining screw 38 determines the amount that the insert blade 18 extends beyond the end face 13.

Another button locator, not shown, in the same manner, determines the amount that blade 18' protrudes beyond end face 13'.

It should be noted that the same type of button locator can be used for locating triangular cutting blades, as well as rhombohedron blades.

When the cutting blade has a trapezoidal cross-section as shown in FIGS. 2, 7 and 8, then the button locator 28 is notched at 46, as indicated by the dashed lines in FIG. 4.

FIGS. 7, 8a and 8b indicate the purpose of the notch. The notch enables the rim 31 of the button locator to abut the insert blade 18 behind the cutting face on the sloping portion 43, with the cutting front portion 44 extending through the notch 46.

FIG. 9 teaches another embodiment wherein the shank of the button locator 24 is threaded as shown at 49. In this embodiment the button locator does not have a threaded aperture 30.

The button locator 24' is threaded into the body until it is in position to locate the insert blade protruding from the end face the desired amount. A locking or set screw 48 is tightened down to lock the threaded button locator in place. Then when it is necessary to remove the insert blade for replacement, or for turning it to expose another cutting edge, the cutting blade is merely set contiguous to the rim of the locator button in its locked position, and then tightened down with the wedge. There is no necessity of rearranging the distance the cutting blade extends beyond the cutter body.

In practice the button locators of the second embodiment are mounted onto the slotting cutter using gauges to assure that the desired slot width is obtained. Once the button locator is set, then the blade can be replaced without effecting the cut slot width.

When the button locator of the first embodiment is used the slotting cutter operator is provided with button locators having different length shanks for the different sized slots desired. The operator selects the button locator to give the desired size. The cutting blade is inserted to index with the button locator and the blade is locked down with a wedge. When the blade needs to be replaced or turned to expose a new cutting edge, the wedge is loosened and the blade is removed. A new blade is inserted or the blade is reinserted to abut the rim of the button locator without the necessity of regauging the protrusion of the insert blade. Thus, the blade can be replaced right on the job without removing the cutter from the arbor. In addition, it should be recognized that the slotting cutter described herein is readily usable in the ordinary manner.

While the principles of the invention have been described above in connection with specific apparatus and applications, it is to be understood that this description is made only by way of example and not as a limitation on the scope of the invention.

I claim:
1. Slotting cutter apparatus,
said apparatus comprising a cutter body,
said cutter body having oppositely disposed end faces and a plurality of peripheral slots extending through said body and end faces to receive insert blades therein, retaining means for retaining said insert blades in said peripheral slots with said insert blades protruding beyond said end faces on at least one side to effect a machine cut, and locator means mounted into the cutter body proximate to said peripheral slots abutting said insert blades on said protruding side for setting the said blades to extend beyond the end faces a desired distance.

2. The slotting cutter apparatus of claim 1 wherein notch means are provided in said locator means for assuring that the cutting edge of said insert blade extends beyond said locator means.

3. The slotting cutter apparatus of claim 1 wherein there are means provided for mounting the locator means on opposite sides of adjacent ones of said peripheral slots so as to index alternate insert blades to extend beyond opposite end faces of said cutter body.

4. The slotting cutter apparatus of claim 1 including fixed distance assuring means for assuring that said insert blades extend beyond said end faces a desired fixed distance, said fixed distance assuring means comprising a shank portion on said locator means extending into the body of said cutter and extending outward therefrom a desired distance, and a flange portion on said locator means at the extended outward end of said shank portion for abutting the insert blades, whereby said insert blades are set at the fixed distances from the opposite cutter faces.

5. The slotting cutter apparatus of claim 4 wherein said cutter body includes a first aperture located proximate to said peripheral slots for receiving said locator means therein, and means for locking said locator means in said first aperture.

6. The slotting cutter apparatus of claim 5 wherein said locator means includes a second aperture therethrough, said second aperture being threaded and being coaxial with said shank portion, and said locking means including locking screw means threading into said threaded second aperture in said shank means from the side of said cutter body opposite the side of the flange of said locator means.

7. The slotting cutter apparatus of claim 6 wherein said fixed distance assuring means comprises the combination of a first portion of said first aperture for receiving said locator means, said first portion having a diameter for slip fittingly receiving the shank of said locator means and terminating in shoulder means for maintaining the flange of said locator means a fixed diameter from the cutter body end face, and a second portion of said first aperture for completely receiving said locking screw means threaded into said threaded second aperture.

8. The slotting cutter apparatus of claim 5 wherein said fastening means comprises threads on the shank of said locator means, said first aperture being threaded for receiving the threaded shank of said locator means, and a locking screw means for threading into said first aperture and locking said locator means with the flange thereof a fixed distance from the end face of said cutter body.

9. The slotting cutter apparatus of claim 8 including notch means in said locator means for enabling said locator means to abut said insert blade behind the leading edge of said insert blade.

10. The slotting cutter apparatus of claim 6 including notch means in said locator means for enabling said locator means to abut said insert blade behind the leading edge of said insert blade.

11. Slotting cutter apparatus, said apparatus comprising a cutter body having oppositely disposed end faces, slots in said cutter body for receiving said insert blades therein, each of said insert blades protruding from one side of said slots past the oppositely disposed end faces to accomplish the cutting, means for retaining said insert blades in said slots, locator means mounted into the cutter body proximate to said slots on the side of the cutter body on which the insert blade protrudes to accomplish the cutting, said locator means extending a fixed distance beyond the face of said cutter body, and means included in said locator means for abutting the protruding insert blade to set said insert blade to extend said fixed distance beyond the face of said cutter body, so that said insert blade will cut a slot of a desired dimension whereby said insert blade can be replaced and said desired dimension retained.

12. The slotting cutter apparatus of claim 11 wherein said locator means comprises a shank portion for insertion into the body of said cutter, and a flange portion for abutting the insert blades.

13. The slotting cutter apparatus of claim 12 wherein locking means are provided for locking said locator means in said cutter body with the flange of said locator means extending said fixed distance beyond said cutter body.

14. The slotting cutter apparatus of claim 13 wherein said locking means includes a locator means aperture coaxial with the shank of said locator means, cutter body aperture means extending through said cutter body, and locking screw means threading into said locator means aperture when said locator means is in said cutter body aperture means from the side opposite the flange of said locator means to retain said locator means in said body with said flange means at said fixed distance from said cutter body.

15. The slotting cutter apparatus of claim 13 wherein said locking means comprises external threads on said shank, cutter body aperture means extending through said cutter body, said cutter body aperture means having internal threads matching said external threads, and locking screw means threading into said threaded cutter body aperture from the side opposite said locator means, to lock said locator means at said fixed distance from said cutter body.

16. The slotting cutter apparatus of claim 12 including notch means in said locator means for enabling said locator means to abut said insert blade behind the cutting edge of said insert blade.

17. Slotting cutter apparatus,
said apparatus comprising a cutter body,
said cutter body having oppositely disposed end faces and a plurality of peripheral slots extending through said body and end faces to receive insert blades therein,
retaining means for retaining said insert blades in said peripheral slots,
locator means mounted into the cutter body proximate to said peripheral slots abutting said insert blades mounted in the peripheral slots for setting the said blades to extend beyond the end faces a desired distance,
said locator means comprises a shank portion for insertion into the body of said cutter and a flange portion for abutting the insert blades,
said cutter body includes a first aperture located proximate to said peripheral slots for receiving said locator means therein,
means for locking said locator means in said first aperture,
said locator means includes a second aperture therethrough,
said second aperture being threaded and being coaxial with said shank portion,
said locking means including locking screw means threading into said threaded second aperture in said shank portion from the side of said cutter body opposite the side of the flange of said locator means,
said first aperture comprises a first portion for receiving said locator means,
said first portion having a diameter for slip fittingly receiving the shank of said locator means, and terminating in shoulder means for maintaining the flange of said locator means a fixed distance from the cutter end face, and
a second portion for completely receiving said locking screw means threaded into said threaded second aperture.

* * * * *